United States Patent [19]
Kremidas

[11] Patent Number: 5,303,593
[45] Date of Patent: Apr. 19, 1994

[54] STRAIN GAUGE DISTRIBUTION FOR RESISTIVE STRAIN GAUGE PRESSURE SENSOR

[75] Inventor: James R. Kremidas, Fenton, Mich.

[73] Assignee: MacLean-Fogg Company, Mundelem, Ill.

[21] Appl. No.: 808,157

[22] Filed: Dec. 13, 1991

Related U.S. Application Data

[63] Continuation-in-part of Ser. No. 711,947, Jun. 7, 1991, Pat. No. 5,174,158.

[51] Int. Cl.$^5$ ............ G01L 7/08; G01L 9/06; G01L 19/04
[52] U.S. Cl. ........................... 73/708; 73/721; 73/727; 338/4
[58] Field of Search ............ 73/708, 720, 721, 726, 73/727, 756, DIG. 4; 338/4, 42; 29/621.1

[56] References Cited

U.S. PATENT DOCUMENTS

| | | | |
|---|---|---|---|
| 3,505,634 | 11/1967 | Von Vick | 338/4 |
| 3,772,628 | 11/1973 | Underwood | 338/4 |
| 4,116,075 | 9/1978 | Ort | 73/708 |
| 4,196,382 | 4/1980 | Bryzek | 323/75 |
| 4,311,980 | 1/1982 | Prudenziati | 338/4 |
| 4,411,158 | 10/1983 | Schaff, Jr. | 73/721 |
| 4,498,070 | 2/1985 | Lirman | 338/42 |
| 4,520,339 | 5/1985 | Utsunomiya | 338/5 |
| 4,702,113 | 10/1987 | Wareham | 73/706 |
| 4,770,045 | 9/1988 | Nakagawa | 73/726 |
| 4,972,716 | 11/1990 | Tobita et al. | 73/721 |
| 4,974,596 | 12/1990 | Frank | 128/672 |
| 5,014,415 | 5/1991 | Okada | 29/621.1 |

OTHER PUBLICATIONS

Chapter 6, Resistor Materials, Processing and Controls by Gilbert C. Waite.

Primary Examiner—Donald O. Woodiel
Attorney, Agent, or Firm—Krass & Young

[57] ABSTRACT

A resistive strain gauge pressure sensor including upper and lower housings coacting to define a pressure chamber within the housing A board member is clamped between the housings and defines a diaphragm portion which extends across the pressure chamber to divide the pressure chamber into upper and lower chamber portions. All of the circuitry of the sensor is screen printed onto the lower planar face of the board member including the various resistor elements of the strain gauge assembly, the various elements of the conditioning circuit receiving the output of the strain gauge assembly, and the various further leads required to connect the circuitry elements to the terminals of the sensor. The sensor terminals are provided by a plurality of connector pins extending downwardly through the board member for connection at their respective lower ends to the circuitry provided on the lower face of the board member. The resistors of the strain gauge circuitry include a first pair of resistors positioned in a central region of the diaphragm on the transverse midline of the diaphragm in straddling relation to the longitudinal midline of the diaphragm and a second pair of resistors positioned on a peripheral portion of the diaphragm in straddling relation to the longitudinal midline of the diaphragm and in respective longitudinal alignment with the first pair of resistors. The bridge circuitry further includes a thermistor positioned on a region of the diaphragm that experiences substantially no strain in response to the deflection of the diaphragm.

6 Claims, 7 Drawing Sheets

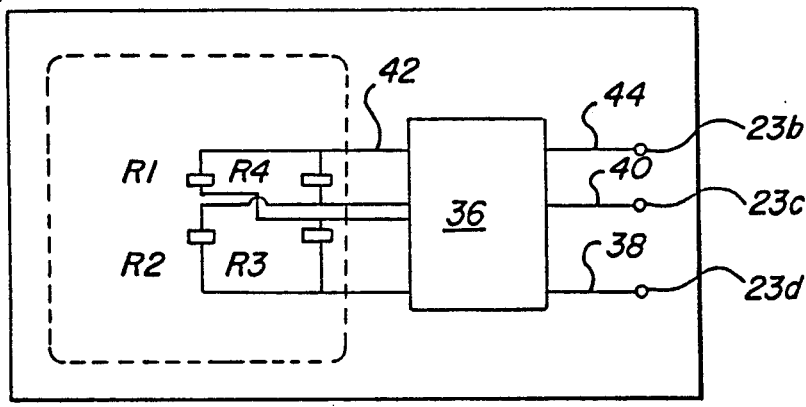
FIG-17
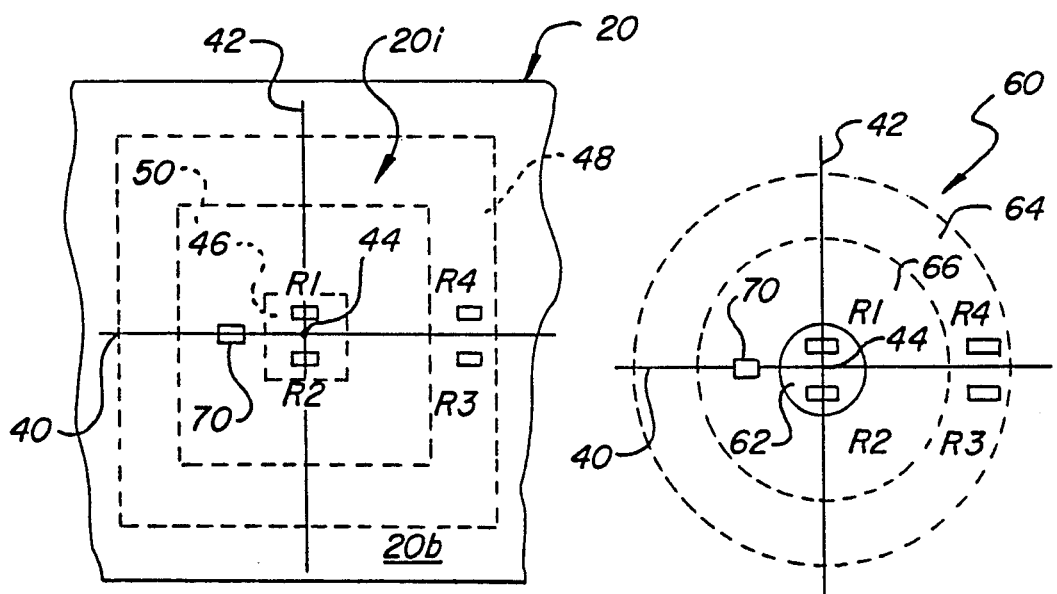
FIG-18
FIG-19
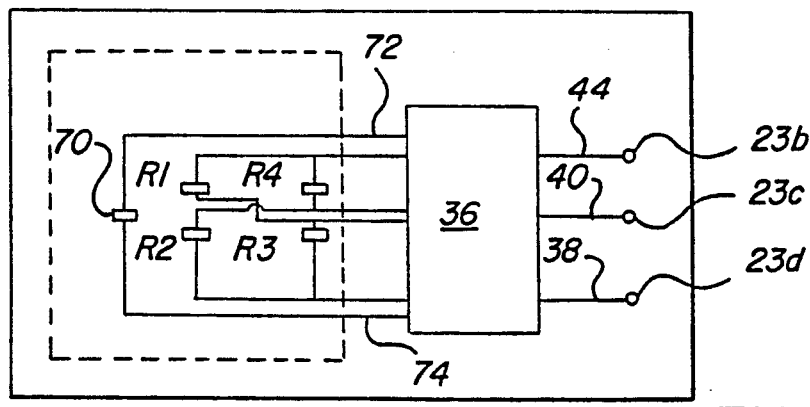
FIG-20

STRAIN GAUGE DISTRIBUTION FOR RESISTIVE STRAIN GAUGE PRESSURE SENSOR

RELATED APPLICATION

This application is a continuation-in-part of U.S. patent application Ser. No. 711,947, filed Jun. 7, 1991, now U.S. Pat. No. 5,174,158.

BACKGROUND OF THE INVENTION

This invention relates to pressure transducers and more particularly to resistive strain gauge pressure sensors.

It is often necessary to determine the pressure of gases and liquids for purposes of measurement or control and many transducers and sensors have been proposed to facilitate the determination of the pressure of gases and liquids. One general type of transducer or sensor for such applications is a resistive strain gauge sensor in which the pressure is sensed and measured based on dimensional changes in strain gauges which generate proportional changes in the resistance of the gauge.

Whereas many types of resistive strain gauge pressure sensors have been designed and made commercially available, and whereas the various resistive strain gauge sensors have proven to be generally satisfactory, these gauges tend to vary in performance from gauge to gauge. Specifically, the design and manufacturing methodology of prior art resistive strain gauge sensors have made it difficult to provide consistent performance from sensor to sensor.

SUMMARY OF THE INVENTION

This invention is directed to the provision of a resistive strain gauge pressure sensor having a simple, inexpensive, and effective design.

More specifically, this invention is directed to the provision of a resistive strain gauge pressure sensor design and manufacturing methodology that facilitates the mass production of sensors having consistent performance characteristics.

The invention pressure sensor is of the type including a diaphragm exposed to the pressure to be sensed and a resistive strain gauge circuit positioned on the diaphragm and including a plurality of first and a plurality of second strain gauge members adapted to be respectively tensioned and compressed in response to flexing of the diaphragm in a given direction so that the circuit generates an output signal in response to flexing of the diaphragm that is proportional to the sensed pressure. According to the invention, all of the first strain gauge members are positioned on a central region of the diaphragm in a clustered formation and all of the second strain gauge members are positioned on a peripheral region of the diaphragm in a clustered formation. This clustered arrangement facilitates the provision of performance repeatability with respect to individual pressure sensors.

According to a further feature of the invention, the first strain gauge members are positioned on a transverse midline of the diaphragm and the second strain gauge members are positioned proximate a longitudinal midline of the diaphragm extending at right angles to the transverse midline. This precise geometric arrangement of the strain gauge members further facilitates the provision of repeatability as between individual sensors.

According to a further feature of the invention, there are two first strain gauge members positioned at the center of the diaphragm in straddling relation to the longitudinal midline and there are two second strain gauge members positioned proximate the periphery of the diaphragm in straddling relation to the longitudinal midline. This arrangement further contributes to the symmetrical and proximal distribution of the various strain gauge members so as to further facilitate the provision of repeatability as between individual sensors.

According to a further feature of the invention, the diaphragm further includes a neutral region between the central region and the peripheral region which experiences substantially no strain during flexing of the diaphragm and the strain gauge further includes a thermistor positioned on the neutral diaphragm region and included in the strain gauge circuit. This arrangement provides temperature compensation for the strain gauge circuit without otherwise disturbing the balance of the strain gauge circuit since the thermistor itself experiences no strain during the flexing of the diaphragm.

According to a further feature of the invention the diaphragm includes three concentric regions including a central region embracing the diaphragm center, an annular neutral region concentrically surrounding the central region, and a peripheral region concentrically surrounding the neutral region, the first strain gauge members are positioned in side-by-side relation on the central region, the second strain gauge members are positioned in side-by-side relation on the peripheral region, and the thermistor is positioned on the annular neutral region.

In the disclosed embodiment of the invention, the strain gauge members are provided in a thick film screen printing operation in which a screen is selectably plugged to leave openings in the screen corresponding to the size and distribution of the strain gauge members whereafter the screen is positioned over the diaphragm, a quantity of ink is positioned on the screen, and a wiper or squeegee is moved over the screen in a single continuous linear movement to apply the ink to the face of the diaphragm in the areas corresponding to the openings in the screen. This specific methodology, in combination with the closely clustered and symmetrical arrangement of the strain gauge members on the diaphragm, allows the thicknesses of the various strain gauge resistor members to be carefully controlled to ensure substantial equality as between the various strain gauges applied to the diaphragm of each sensor and to ensure precise repeatability with respect to the strain gauge thicknesses from sensor to sensor.

BRIEF DESCRIPTION OF THE DRAWINGS

FIG. 17 illustrates the strain gauge circuitry employed in the invention sensor;

FIG. 18 is a schematic detail view of the diaphragm employed in the invention sensor;

FIG. 19 is a schematic fragmentary view of an alternate form of diaphragm for use in the invention sensor; and FIG. 20 illustrates an alternate form of strain gauge circuitry for use in the invention sensor.

DETAILED DESCRIPTION OF THE PREFERRED EMBODIMENTS

Figures 1, 2:
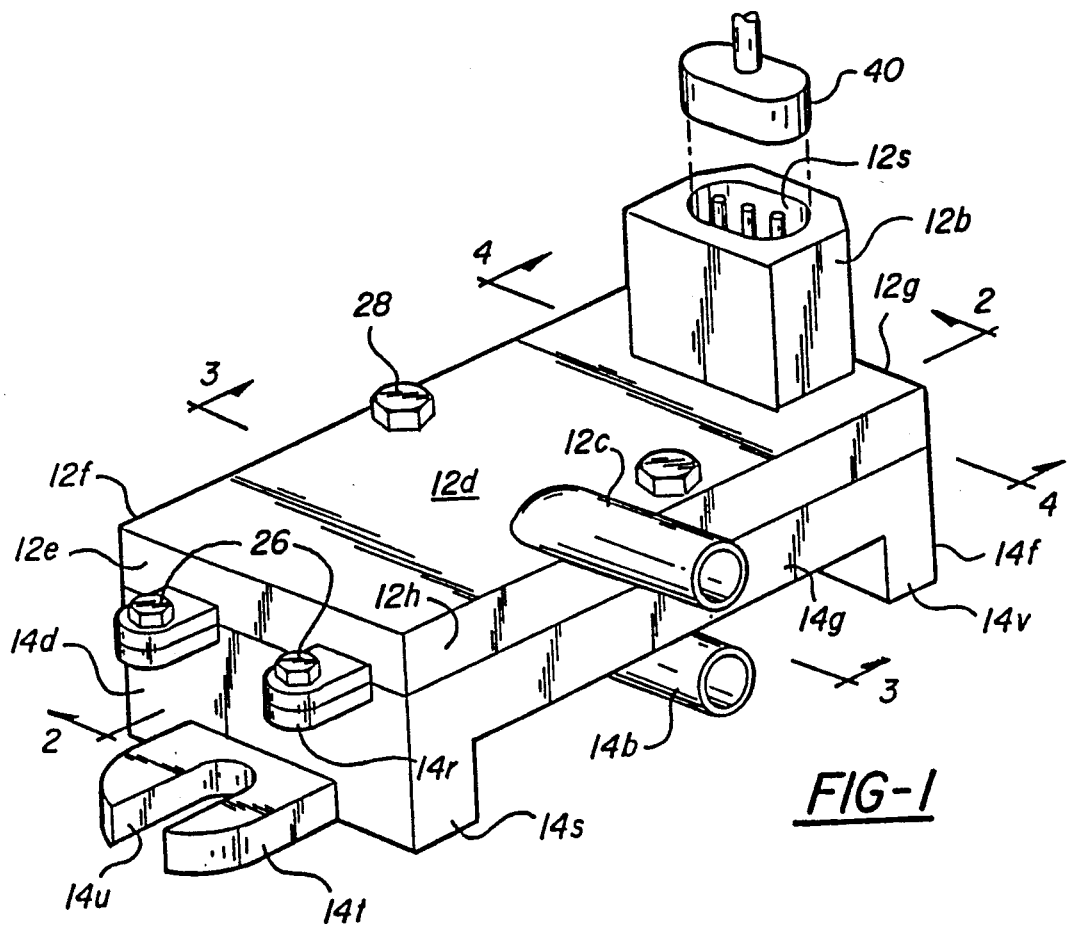
FIG. 1 is a perspective view of a sensor according to the invention.
FIGS. 2, 3, and 4 are cross-sectional views taken respectively on lines 2—2, 3—3 and 4—4 of FIG. 1.
Figure 3:
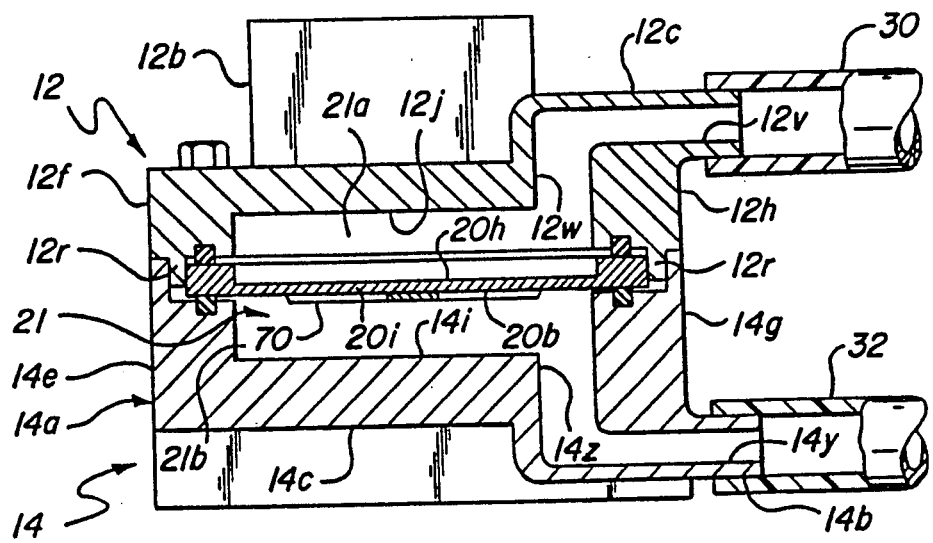
Figure 4:
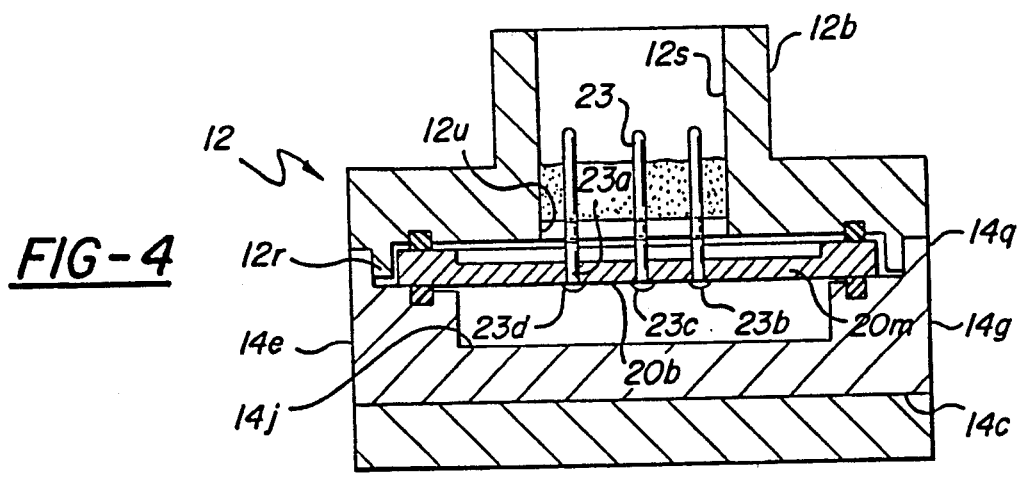
Figure 6:
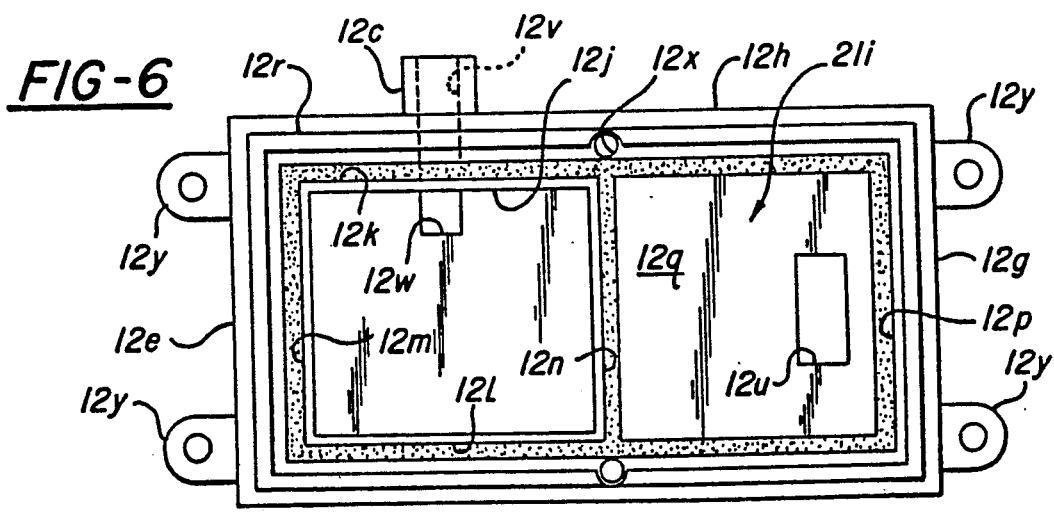
FIG. 6 is a bottom view of an upper housing employed in an invention sensor.
Figure 5:
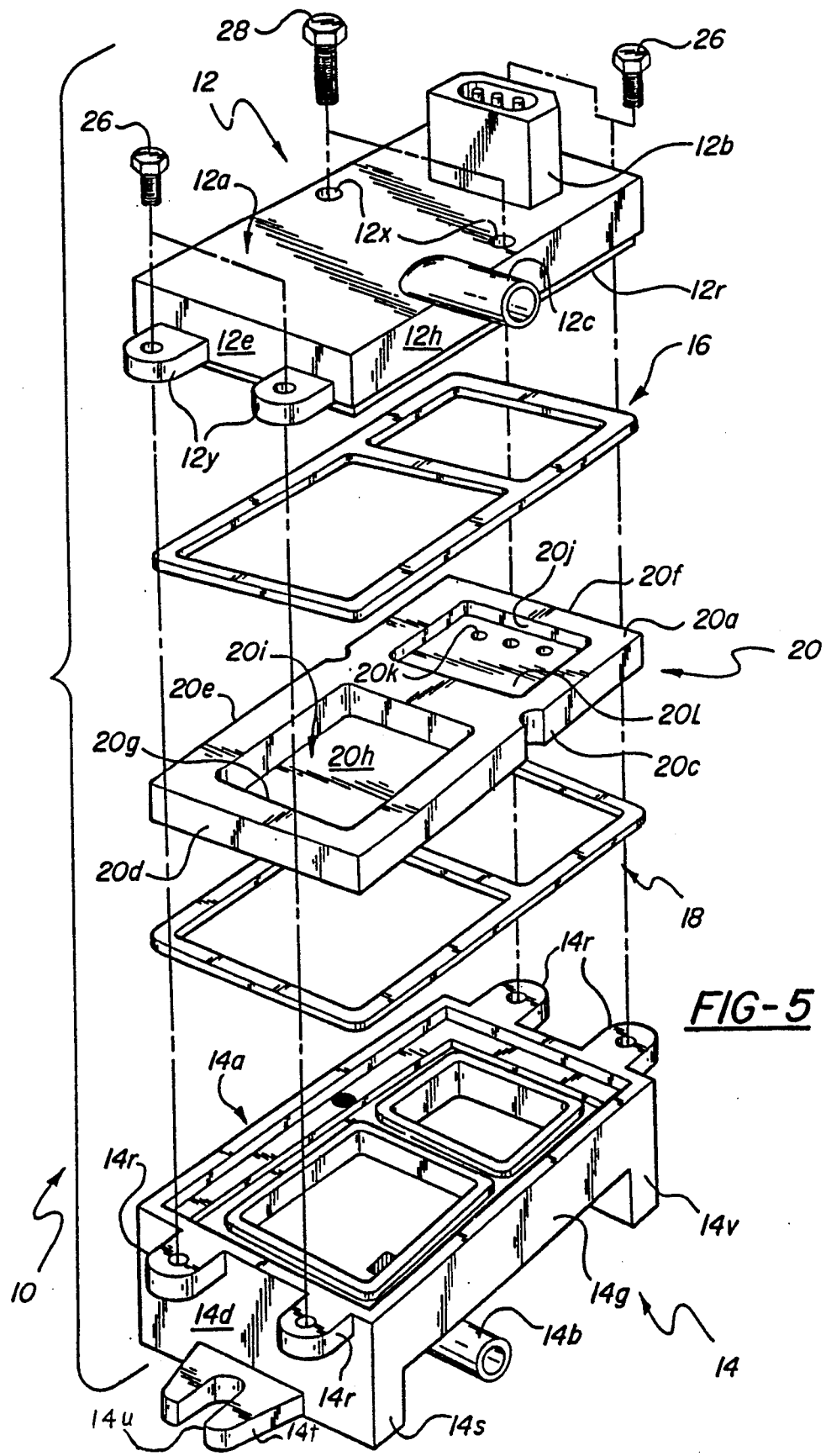
FIG. 5 is an exploded perspective view of the invention sensor.
Figure 7:
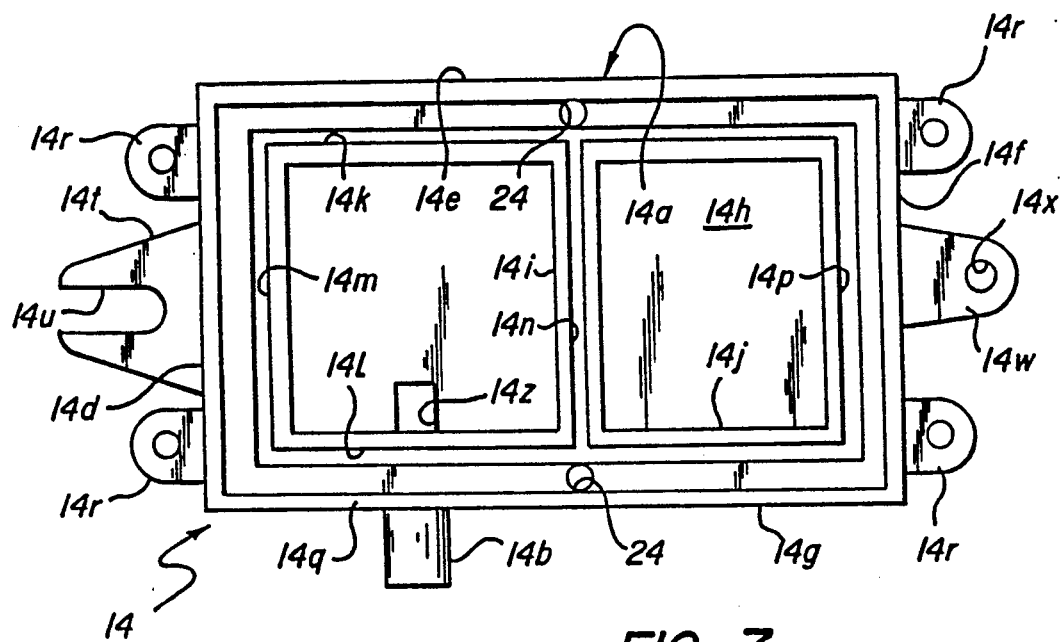
FIG. 7 is a top view of a bottom housing employed in the invention sensor.
Figure 8:
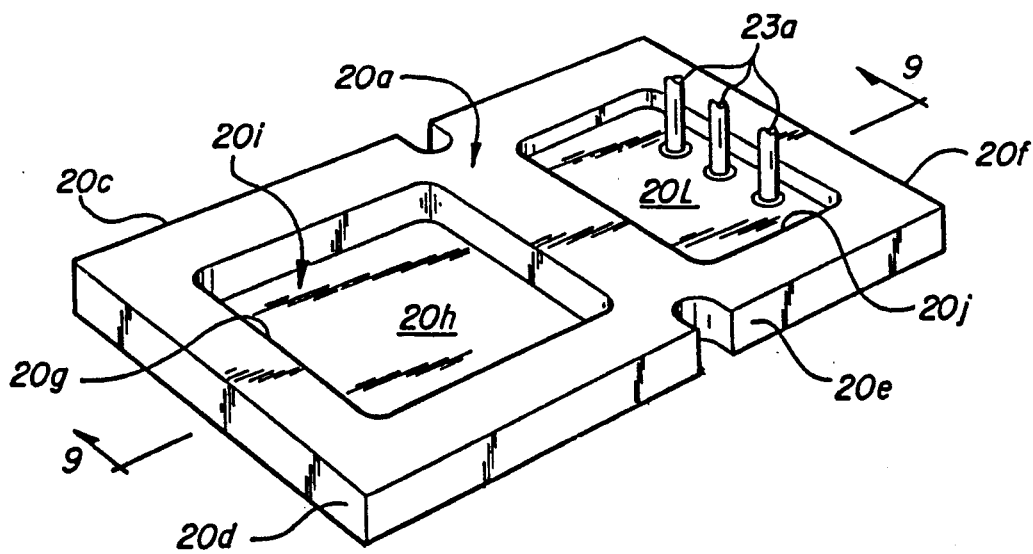
FIG. 8 is a perspective view of a board member employed in the invention sensor.
Figure 9:
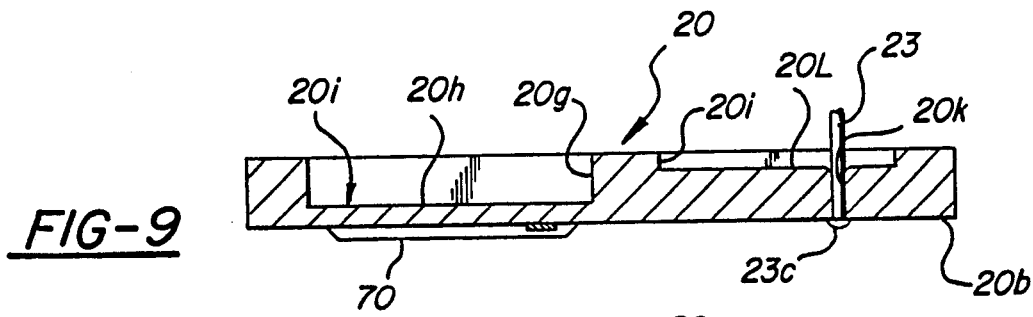
FIG. 9 is a cross-sectional view taken on line 9—9 of FIG. 8.

The invention sensor, 1-10, broadly considered, includes an upper housing 12, a lower housing 14, an upper seal 16, a lower seal 18, and a board member assembly 20.

Upper housing 12 is formed of a suitable material such, for example as aluminum or a suitable plastic, and includes a main body portion 12a, an upstanding socket or receptacle portion 12b, and a conduit or tube portion 12c.

Main body portion 12a includes an upper generally planar surface 12d, side edges 12e, 12f, 12g and 12h, and a lower surface generally indicated at 12i. Lower face 12i includes a rectangular downwardly opening cavity 12j and a seal groove including longitudinal portions 12j and 12l connected by transverse portions 12m, 12n and 12p. Seal portions 12k, 12l, 12m and 12n coact to define a generally rectangular groove configuration surrounding rectangular cavity 12j and seal portions 12k, 12l, 12n and 12p coact to define a generally rectangular groove configuration surrounding a rectangular area 12q forming a portion of the lower surface 12i of the upper housing. A downwardly extending flange 12r extends around the perimeter of the lower surface 12i of the upper housing in surrounding relation to the seal groove and in surrounding relation to cavity 12j and area 12q.

Socket portion 12b upstands from upper surface 12d proximate side edge 12g of the housing and defines a cavity 12s which terminates in a lower wall 12t in which is formed a rectangular opening 12u opening at its lower end in the area 12q on the lower face 12i of the housing.

Tube portion 12c upstands from upper surface 12d proximate side edge 12h and in transverse alignment with cavity 12j and defines a central passage 12v which opens in cavity 12j at 12w.

Upper housing 12 further includes bores 12x extending through the housing and spaced lugs 12y at the opposite ends of the housing.

Lower housing 14 is also formed of a material such as aluminum or plastic and includes a main body portion 14a and a conduit or tube portion 14b.

Main body portion 14a includes a lower generally planar surface 14c, side edges 14d, 14e, 14f, and 14g, and an upper surface indicated generally at 14h. Upper surface 14h defines a relatively shallow rectangular cavity 14i corresponding in size and configuration to the cavity 12j in the lower surface of the upper housing, a relatively deep rectangular cavity 14j, and a seal groove including longitudinal groove portions 14k, 14l, 14n, and 14p. Seal portions 14k, 14l, 14m, and 14n are disposed in surrounding relation to cavity 14i and seal portions 14l, 14m, 14n, and 14p are disposed in surrounding relation to cavity 14h. Cavity 14j will be seen to correspond in size and configuration to the area 12q on the lower surface of the upper housing. The main body portion of the lower housing further includes an upwardly extending flange portion 14q extending around the periphery of the upper face of the housing, spaced lug pairs 14r at either end of the housing, a flange portion 14s at one end of the housing terminating in a mounting flange 14t defining a U-shaped mounting opening 14u, and a mounting flange 14v at the other end of the housing terminating in a mounting flange 14w defining a mounting hole 14x.

Conduit or tube portion 14b downstands from lower surface 14c proximate side edge 14g and in transverse alignment with cavity 14i and defines a central passage 14y opening at 14z in the lower face of cavity 14i.

Upper and lower seals 16 and 18 are identical, are formed, for example, of silicone, and are sized and configured to seat respectively in groove 12k-12p in the lower surface of the upper housing 12 and in groove 14k-14p in the upper surface of the lower housing 14.

Board member 20 is formed of a suitable dielectric material such as alumina and has a generally block-like rectangular configuration defined by an upper surface 20a, a lower surface 20b, and side edges 20c, 20d, 20e, and 20f. A generally rectangular cavity 20g is formed in the upper surface 20a of the board member corresponding in size and configuration to cavities 12j and 14j formed respectively in the upper and lower housings. Cavity 20g has a depth relative to the total thickness of the board member such that the lower face 20h of the cavity coacts with the lower surface 20b of the board member to define a relatively thin flexible diaphragm portion 20i of the board member of generally rectangular configuration corresponding in size and configuration to the cavities 12j, 20g and 14j.

A further cavity 20j is formed in the upper surface 20a of the board member. Cavity 20j has a size and configuration generally corresponding to the size and configuration of the cavity 14j in the lower housing and includes three spaced bores or openings 20k. Cavity 20j is significantly shallower than cavity 20g so that the lower surface 20l of cavity 20j coacts with the lower surface 20b of the board member to define a relatively thick mounting portion 20m through which the bores 20k extend.

Board member 20 will thus be seen to comprise a relatively thin diaphragm portion 20i and a relatively thick substrate portion comprising the mounting portion 20m and the annular board portions surrounding the diaphragm portion 20i and the mounting portion 20m.

In the assembled relation of the sensor, the board member 20 is clamped around its perimeter between upper housing 12 and lower housing 14 with the flange 14n on the lower housing telescopically receiving the flange 12r on the upper housing and with the housings coacting to define a pressure chamber 21 constituted by cavities 12j and 14i and an instrumentation chamber 22 defined between the lower face of cavity 14j and area 12q on the lower face of the upper housing; the outer perimeter of the board member is seated snugly within the inner perimeter defined by flange 12r; the diaphragm portion 20i of the board member extends across the pressure chamber 21 to divide the pressure chamber 21 into an upper pressure chamber portion 21a above the diaphragm portion and a lower pressure chamber portion 21b below the diaphragm portion; a plurality of connector pins or terminals 23 are positioned in spaced relation within the cavity 12s of socket portion 12b of the upper housing and extend downwardly through a suitable insulating material 24 positioned within cavity 12s and pass at their lower ends 23a through opening 12u and through a respective bore 20k in the mounting portion 20m of the board member to position their respective lower tips 23b, 23c, and 23d in proximity to the planar underface 20b of the board member; upper and lower seals 16 and 18 are sealed in their respective grooves and respectively engage the upper and lower faces of the board member to sealingly isolate the board member from the exterior of the sensor and to sealingly isolate pressure chamber 21 from instrumentation chamber 22; bolts 26 pass downwardly through holes in lugs 12y for threaded engagement with threaded bores in lugs 14r to maintain the upper and lower housings in tightly coupled relation with the board member clamped therebetween; and further bolts 28 extend downwardly through holes 12z in the upper housing member for threaded engagement with threaded bores 24 in the lower housing 14 to supplement the clamping action of the bolts 26.

It will be understood that, in use, the sensor is suitably secured to a support surface utilizing flange U opening 14u and flange mounting hole 14x and hoses 30 and 32 are respectively fitted over tube portions 12c and 14b of the respective housings to communicate the gas or fluid pressures in hoses 30 and 32 respectively with the upper and lower faces of the diaphragm portion of the board member so as to produce selected deflection of the diaphragm portion in proportion to the pressure differential between the fluid pressures in upper and lower pressure chamber portions 21a and 21b as transmitted by hoses 30 and 32.

Figure 10:
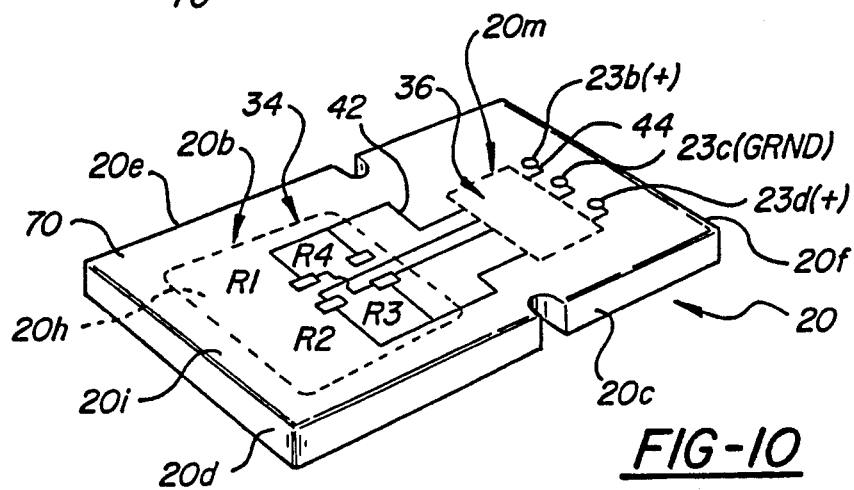
FIG. 10 is a perspective view showing the bottom of the board member.
Figure 12:
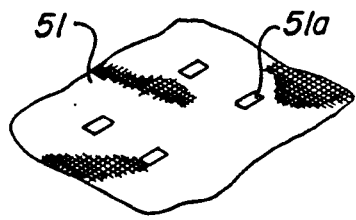
FIG. 12 is a fragmentary detail view of a screen employed in the methodology of FIG. 11.
Figure 11:
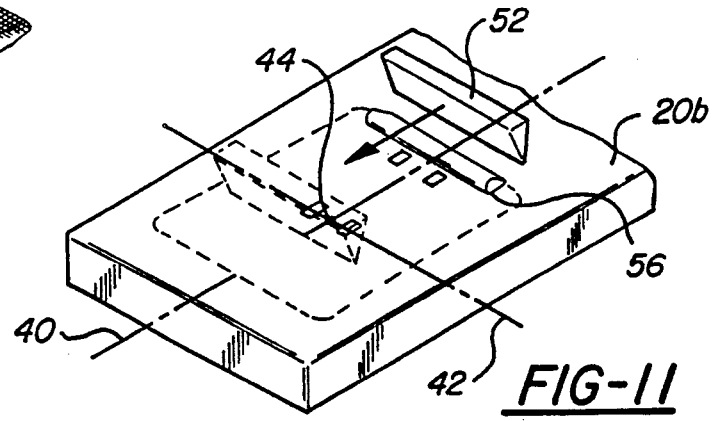
FIG. 11 is a fragmentary perspective view showing the methodology whereby the strain gauges are formed on the diaphragm of the invention sensor.
Figure 13:
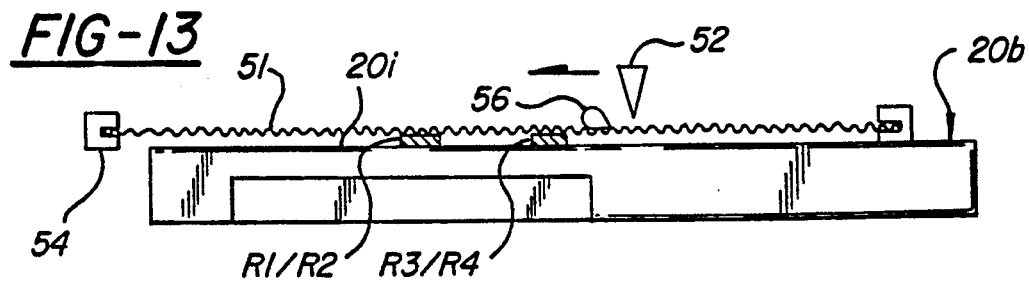
FIG. 13 is a side elevational view further illustrating the methodology of FIG. 11.
Figure 14:
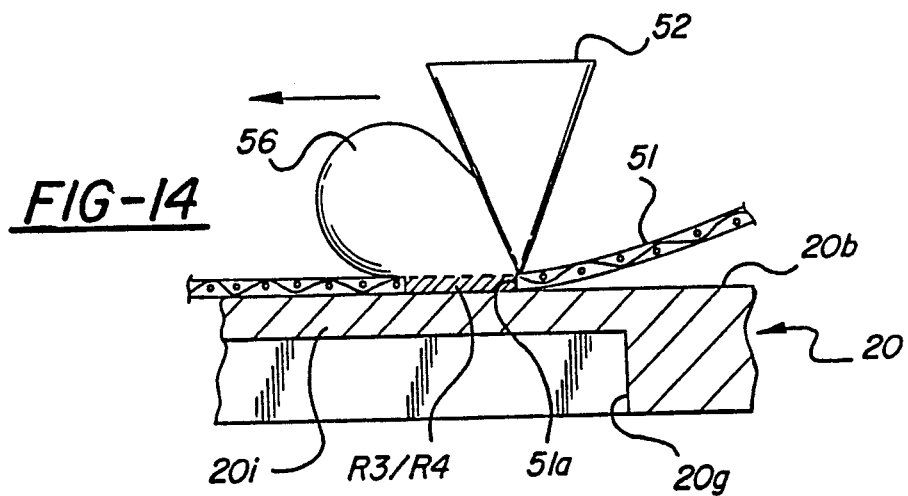
FIGS. 14, 15 and 16 are fragmentary views still further illustrating the methodology of FIG. 11.
Figure 15:
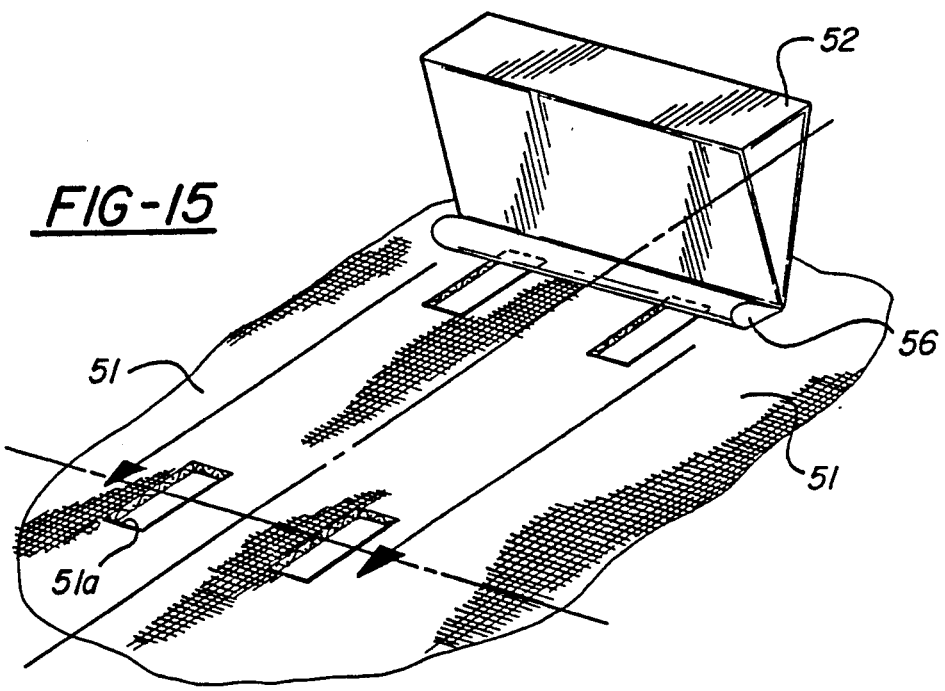
Figure 16:
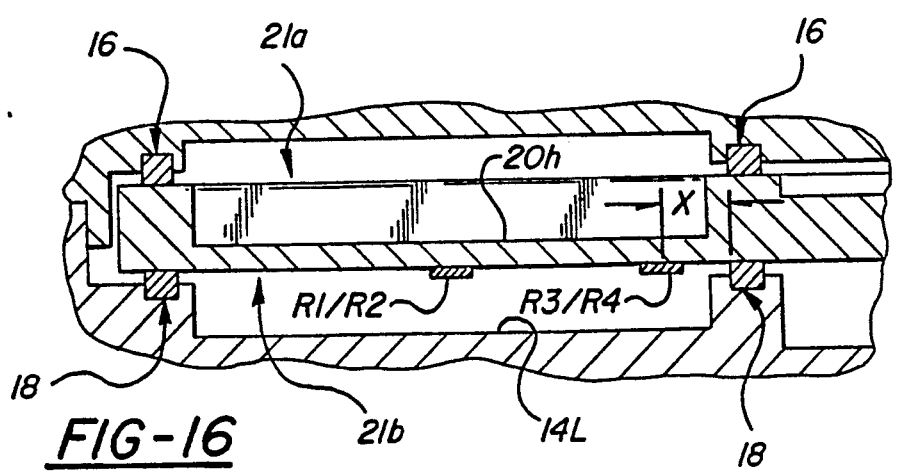

As best seen in FIG. 10, the lower planar surface 20b of member 20 is provided with a resistive strain gauge assembly 34 and a conditioning circuit 36. Specifically, strain gauge assembly 34 is provided on planar surface 20b in underlying relation to diaphragm portion 20i and conditioning circuit 36 is provided on planar surface 20b in underlying relation to mounting portion 20m.

Strain gauge assembly 34 includes strain gauges R1, R2, R3 and R4 which are distributed over the area of diaphragm portion 20i in a manner such that, with a given deflection of the diaphragm portion, certain of the gauges experience elongation and certain of the gauges experience compression.

Specifically/ as best seen in FIG. 18, the lower surface 20b of diaphragm 20i will be seen to be divided into quadrants by the longitudinal midline 40 of the board member 20 and by a transverse midline 42 disposed at right angles to midline 40 and passing through the center 44 of the diaphragm and the diaphragm may be considered to be comprised of a central region 46 embracing center 44; an annular outer peripheral region 48 surrounding central region 46; and an intermediate neutral annular region 50 positioned in concentric relation between central region 46 and annular outer peripheral region 48. It will be understood that the surface of central region 46 will experience tensioning in response to upward deflection of the diaphragm and compression in response to downward deflection of the diaphragm; the surface of annular outer peripheral region 48 will experience compression in response to upward deflection of the diaphragm and tensioning in response to downward deflection of the diaphragm; and the surface of intermediate neutral region 50 will experience relatively little compression or tensioning in response to upward or downward deflection of the diaphragm. Strain gauges R1 and R2 are positioned as a cluster within the region 46 on midline 42 in straddling relation to midline 40 and strain gauges R3 and R4 are positioned as a cluster within outer annular region 48 in straddling relation to midline 40 and in respective longitudinal alignment with sensors R1 and R2. It will be seen that strain gauges R1,R2,R3 and R4 are arranged in a rectangular pattern on the diaphragm.

With this strain gauge distribution, as the diaphragm is deflected upwardly, strain gauges R1 and R2 experience tensioning or elongation and strain gauges R3 and R4 experience compression or foreshortening and, conversely, when the diaphragm is deflected downwardly, strain gauges R1 and R2 experience compression or foreshortening and strain gauges R3 and R4 experience tensioning or elongation.

The terminals provided by the lower ends 23b, 23c, and 23d of the connector pins 23 comprise a central common ground terminal 23c flanked by positive terminals 23b and 23d. Ground terminal 23c and positive terminal 23b coact to provide an input voltage to the strain gauge assembly via leads 38 and 40. The strain gauges will be seen to be arranged in a well-known Wheatstone Bridge configuration with an output lead 42 transmitting the output voltage of the strain gauge assembly to conditioning circuit 36. Conditioning circuit 36 will be understood to include various circuit elements to modulate the output signal of the strain gauge assembly. Circuit 36 may include, for example, printed resistors for adjusting and balancing the circuit and for temperature compensation; discrete IC amplifiers to amplify the strain gauge output; discrete diodes for temperature compensation; and discrete capacitors for filtering out unwanted high response noise. The conditioned output signal is thereafter transmitted to the positive terminal 23b via a lead 44 so that, with a suitable power plug 40 plugged into socket 12b for coaction with the connector pins 23, and in response to the generation of a differential pressure across the diaphragm portion 20i of the board member, an output voltage appears across the ground terminal 23c and positive terminal 23b which is proportional to the differential in pressure being experienced by the diaphragm portion.

The circuitry on the lower face 20b of the board member assembly, with the exception of the discrete circuit components, is preferably provided in a thick film screen printing operation in which suitable material is screen printed onto the lower planar face of the board member assembly to provide the various elements of the circuitry. The screen printing is preferably carried out in a multistep process in which first the conductors are printed utilizing gold, platinum or silver material, then the resistors (other than the strain gauge resistors) are printed utilizing suitable resistive material, and then the strain gauge resistors are printed utilizing a suitable thick film resistor material.

The printing of the strain gauge resistors, as seen in FIGS. 11–15, is accomplished utilizing a screen 51 and a wiper or squeegee 52. Screen 51 is mounted in a peripheral frame 54 and is held in a position over and slightly spaced above the surface 20b of diaphragm 20i.

Screen 50 is prepared by suitably plugging the screen mesh with the exception of screen apertures 51a corresponding in size and positioning to the resistors R1, R2, R3, and R4 so that when a supply of ink 56 is positioned on the upper face of the screen 51 and the wiper 50 is moved over the screen in a single linear unidirectional movement, the ink is uniformly applied to the upper face of the diaphragm as the ink is distributed through the openings 51a in the screen by the wiper with the wiper simultaneously moving the screen downwardly into contact with the upper face of the diaphragm to ensure a positive interaction as between the screen and the diaphragm.

Since the resistors R3 and R4 are positioned close together in side-by-side relation on the peripheral portion of the diaphragm in straddling relation to the longitudinal midline 40, the thickness of R3 may be carefully controlled to precisely equal the thickness of R4 and, similarly, the thickness of R1 may be precisely controlled to precisely match the thickness of R2 as well as to match the thicknesses of R3 and R4. The single linear movement of the wiper 52 over the upper face of the diaphragm, in coaction with the screen 51 and the ink 56, thus has the effect of providing four resistors of precisely the same thickness, and the described arrangement and methodology also allows sensors to be produced in a mass production operation wherein the thicknesses of the resistors provided on each successive sensor exactly match each other and exactly match the thicknesses of previously fabricated sensors.

The precise matching of the thicknesses of the individual resistors on a given sensor as well as the precise repeatability of the thicknesses of the resistors on one sensor as compared to the thicknesses of the resistors on other sensors facilitates the balancing of the bridge circuitry of the sensor and facilitates the provision of precise temperature compensation for the strain gauge circuitry.

The described resistor distribution and methodology also ensures that resistors R3 and R4 are positioned functionally at an identical location on the diaphragm so that they will experience the precise same strain in response to a given pressure differential applied across the diaphragm irrespective of variations in the distance X between the clamped edge of the diaphragm and the resistors that may occur from sensor to sensor due to manufacturing tolerances, thereby further facilitating the balancing of the bridge circuitry of the sensor and further facilitating the provision of precise temperature compensation for the strain gauge circuitry.

Whereas the invention has been described with reference to a rectangular diaphragm 20i, the invention is equally applicable to diaphragms of different configurations such as the circular diaphragm 60 seen in FIG. 19 including a central circular region 62 embracing the center 44 of the diaphragm; an outer circular annular region 64; and a circular annular region 66 interposed between the central region 62 and outer annular region 64. As with rectangular diaphragm 20i resistors R1 and R2 are positioned on transverse midline 42 in straddling relation to longitudinal midline 40 and resistors R3 and R4 are positioned in outer annular region 64 in straddling relation to longitudinal midline 40 and in respective longitudinal alignment with resistors R1 and R2.

In the modified form of the invention seen in FIG. 20, the sensor further includes a thermistor 70 incorporated into the strain gauge circuitry by leads 72 and 74 and positioned on the central neutral annular region 50 of the rectangular diaphragm seen in FIG. 18 or on the central neutral annular region 66 of the circular diaphragm seen in FIG. 19. The thermistor 70 will be understood to comprise an electrical resistor making use of a semiconductor whose resistance varies sharply in a known manner with temperature variations so that thermistor 70 functions to adjust the performance of the sensor in compensation for environmental temperature variations. Since the thermistor is located on a region of the diaphragm that experiences substantially no strain during the flexing of the diaphragm, the resistance added to the bridge circuit by the thermistor is never affected by compression or elongation of the thermistor so that the thermistor acts in a purely temperature compensating fashion with respect to the overall strain gauge circuitry.

The invention will be seen to provide a resistive strain gauge sensor wherein the thicknesses of the resistors may be precisely and carefully controlled to ensure precise matching of the thicknesses of the resistors on the diaphragm of a given sensor and to ensure precise matching of the thicknesses of the resistors of the diaphragm of one sensor as compared to the resistors of the diaphragm of other sensors.

The invention will also be seen to provide a resistive strain gauge sensor wherein the opposed strain gauges in the bridge circuit experience precisely the same strain so as to facilitate balancing of the bridge circuitry and facilitate the provision of precise temperature compensation for the strain gauge circuitry.

The invention will also be seen to provide a resistive strain gauge sensor including simple and effective means for compensating the bridge circuitry of the sensor for variations in environmental temperatures.

Whereas preferred embodiments of the invention have been illustrated and described in detail, it will be apparent that various changes may be made in the disclosed embodiments without departing from the scope or spirit of the invention.

I claim:

1. A resistive strain gauge pressure sensor including a diaphragm exposed to a pressure to be sensed and a resistive strain gauge circuit positioned on the diaphragm and including a plurality of first and a plurality of second strain gauge members adapted to be respectively tensioned and compressed in response to flexing of the diaphragm in a given direction so that the circuit generates an output signal in response to flexing of the diaphragm; characterized in that all of the first strain gauge members are positioned on the central region of the diaphragm in a clustered formation, all of the second strain gauge members are positioned on the peripheral region of the diaphragm in a clustered formation, and the diaphragm further includes a neutral region between the central region and the peripheral region experiencing substantially no strain during flexing of the diaphragm and the strain gauge circuit further includes a thermistor positioned on the neutral diaphragm region.

2. A sensor according to claim 1 wherein the diaphragm includes a transverse midline and a longitudinal midline intersecting at right angles at the center of the diaphragm, the diaphragm includes three concentric regions including the central region embracing the diaphragm center, an annular neutral region concentrically surrounding the central region, and the peripheral region concentrically surrounding the neutral region.

3. A sensor according to claim 2 wherein the strain gauge circuit further includes a thermistor positioned on the annular neutral region of the diaphragm.

4. The resistive strain gauge pressure sensor including:
- a diaphragm exposed to a pressure to be sensed and having a transverse midline passing through the center of the diaphragm, a central region positioned on the midline proximate the center of the diaphragm, a peripheral region surrounding the central region, and a neutral region between the central region and the peripheral region experiencing substantially no strain during flexing of the diaphragm;
- a first pair of resistor members positioned side by side on the central region of the diaphragm;
- a second pair of resistor members positioned side by side on the peripheral region of the diaphragm on one side of the transverse midline;
- a thermistor positioned on the neutral region of the diaphragm; and
- circuit means electrically interconnecting the resistor members and the thermistor and operative to generate an output signal in response to flexing of the diaphragm.

5. A resistive strain gauge pressure sensor including a diaphragm exposed to a pressure to be sensed and a resistive strain gauge circuit positioned on the diaphragm and including first and second strain gauge members adapted to be respectively tensioned and compressed in response to flexing of the diaphragm in a given direction so that the circuit generates an output signal in response to flexing of the diaphragm; characterized in that there are a total of four strain gauge members, the four members are arranged in a rectangular pattern on the diaphragm with a strain gauge at each corner of the rectangle, the diaphragm includes a transverse midline and longitudinal midline intersecting at right angles at the center of the diaphragm, the diaphragm includes three concentric regions including a central region encompassing the diaphragm center, an annular neutral region concentrically surrounding the central region, and an annular peripheral region concentrically surrounding the annular neutral region, two of the strain gauge members are arranged in side by side relation on the central region, and the other two strain gauge members are arranged in side by side relation on the annular peripheral region.

6. A sensor according to claim 5 wherein the strain gauge circuit further includes a thermistor positioned on the annular neutral region of the diaphragm.

* * * * *